United States Patent
McMullen

(10) Patent No.: US 11,457,016 B2
(45) Date of Patent: *Sep. 27, 2022

(54) MANAGING SHARED APPLICATIONS AT THE EDGE OF A CONTENT DELIVERY NETWORK

(71) Applicant: Fastly Inc., San Francisco, CA (US)

(72) Inventor: Tyler McMullen, San Francisco, CA (US)

(73) Assignee: Fastly, Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/091,167

(22) Filed: Nov. 6, 2020

(65) Prior Publication Data

US 2021/0136080 A1    May 6, 2021

Related U.S. Application Data

(60) Provisional application No. 62/931,465, filed on Nov. 6, 2019.

(51) Int. Cl.
*H04L 29/06* (2006.01)
*H04L 9/40* (2022.01)
*H04L 67/02* (2022.01)
*H04L 67/63* (2022.01)
*H04L 67/5682* (2022.01)

(52) U.S. Cl.
CPC ............ *H04L 63/102* (2013.01); *H04L 67/02* (2013.01); *H04L 67/5682* (2022.05); *H04L 67/63* (2022.05)

(58) Field of Classification Search
CPC ............... G06F 9/45533; G06F 9/5077; G06F 9/45558; G06F 21/53; G06F 2221/2149; H04L 67/2842; H04L 67/02
See application file for complete search history.

(56) References Cited

U.S. PATENT DOCUMENTS

| | | | |
|---|---|---|---|
| 10,382,401 B1* | 8/2019 | Lee ........................ | H04L 67/10 |
| 10,552,639 B1* | 2/2020 | Buzbee ................ | G06F 21/629 |
| 10,582,000 B1* | 3/2020 | Amrani .................. | G06F 21/10 |
| 10,817,424 B1* | 10/2020 | Amrani ............... | G06F 12/0891 |
| 11,188,345 B2* | 11/2021 | Chen ..................... | G06F 9/4406 |
| 2003/0026254 A1 | 2/2003 | Sim | |
| 2004/0205162 A1 | 10/2004 | Parikah | |
| 2007/0244987 A1* | 10/2007 | Pedersen ................ | H04L 67/06 709/217 |
| 2010/0281102 A1* | 11/2010 | Chinta .................... | G06F 21/53 709/203 |
| 2012/0089700 A1* | 4/2012 | Safruti ............... | H04L 67/2842 709/217 |
| 2012/0278439 A1 | 11/2012 | Ahiska et al. | |
| 2014/0173066 A1 | 6/2014 | Newton et al. | |
| 2018/0278675 A1* | 9/2018 | Thayer ................... | G06F 9/505 |
| 2020/0412826 A1* | 12/2020 | Levy Nahum ......... | H04L 43/08 |

* cited by examiner

*Primary Examiner* — Chirag R Patel

(57) ABSTRACT

Disclosed herein are enhancements for deploying applications in an edge system of a communication network. In one implementation, a cache node in a content delivery network identifies a request for an application that is shared by a plurality of customers. In response to the request, the cache node determines whether the customer associated with the request is permitted to execute the application and, if permitted, initiates the application as an isolation instance. The cache node further, in response to completing the application, returns control to a source operation associated with the request.

18 Claims, 8 Drawing Sheets

| APPLICATION ID COLUMN 410 | CUSTOMER COLUMN 420 | CUSTOMER COLUMN 421 | CUSTOMER COLUMN 422 | CUSTOMER COLUMN 423 |
| --- | --- | --- | --- | --- |
| APPLICATION 411 | CUSTOMER 430 | CUSTOMER 431 | CUSTOMER 432 | CUSTOMER 433 |
| APPLICATION 412 | CUSTOMER 430 | | | |
| APPLICATION 413 | CUSTOMER 431 | CUSTOMER 433 | | |
| APPLICATION 413 | CUSTOMER 435 | CUSTOMER 436 | | |

FIGURE 4

MANAGING SHARED APPLICATIONS AT THE EDGE OF A CONTENT DELIVERY NETWORK

RELATED APPLICATIONS

This application hereby claims the benefit of and priority to U.S. Provisional Patent Application No. 62/931,465, titled "MANAGING SHARED APPLICATIONS AT THE EDGE OF A CONTENT DELIVERY NETWORK," filed Nov. 6, 2019, and which is hereby incorporated by reference in its entirety.

BACKGROUND

Content delivery networks have evolved to provide more than just caching content at the edge. Rather, many content delivery networks now provide distributed denial of service (DDoS) protection, security shields, load balancing, video streaming, content optimization, and other services on behalf of their customers. In addition, their customers are now able to run their own application code at the edge, to process incoming requests in a customized manner.

Allowing customer applications to run at the edge presents several challenges with respect to isolation. When one application is not effectively isolated from another, a number of problems can occur. For example, one customer's application may interfere with another customer's application on the same server. In another example, one application may be able to access data that it shouldn't. The failure of one application may also take down other applications at the same time—or even the entire server.

Various solutions have been attempted to isolate applications at the edge. In one, each customer is given a virtual machine within which to run their applications. This approach isolates one customer's application(s) from another's but fails to isolate processing of the customer's own requests. Thus, one instance of the customer's application code handling one request may interfere with another instance of the code handling another, different request.

Overview

Technology is disclosed herein for managing and deploying shared applications at the edge of a content delivery network. In one implementation, a cache node in a content delivery network identifies a request for an application, wherein the application is shared among a plurality of customers. The cache node further determines that a customer associated with the request is permitted to execute the application and, in response to determining that the customer is permitted to execute the application, initiating the application as an isolation instance for the request. Once the application is completed, the cache node may return control to an operation associated with the request.

BRIEF DESCRIPTION OF THE DRAWINGS

The following description and associated figures teach the best mode of the invention. For the purpose of teaching inventive principles, some conventional aspects of the best mode can be simplified or omitted. The following claims specify the scope of the invention. Note that some aspects of the best mode cannot fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

FIG. 4 illustrates a data structure to manage application permissions on a cache node according to an implementation.

DESCRIPTION

Figure 1:
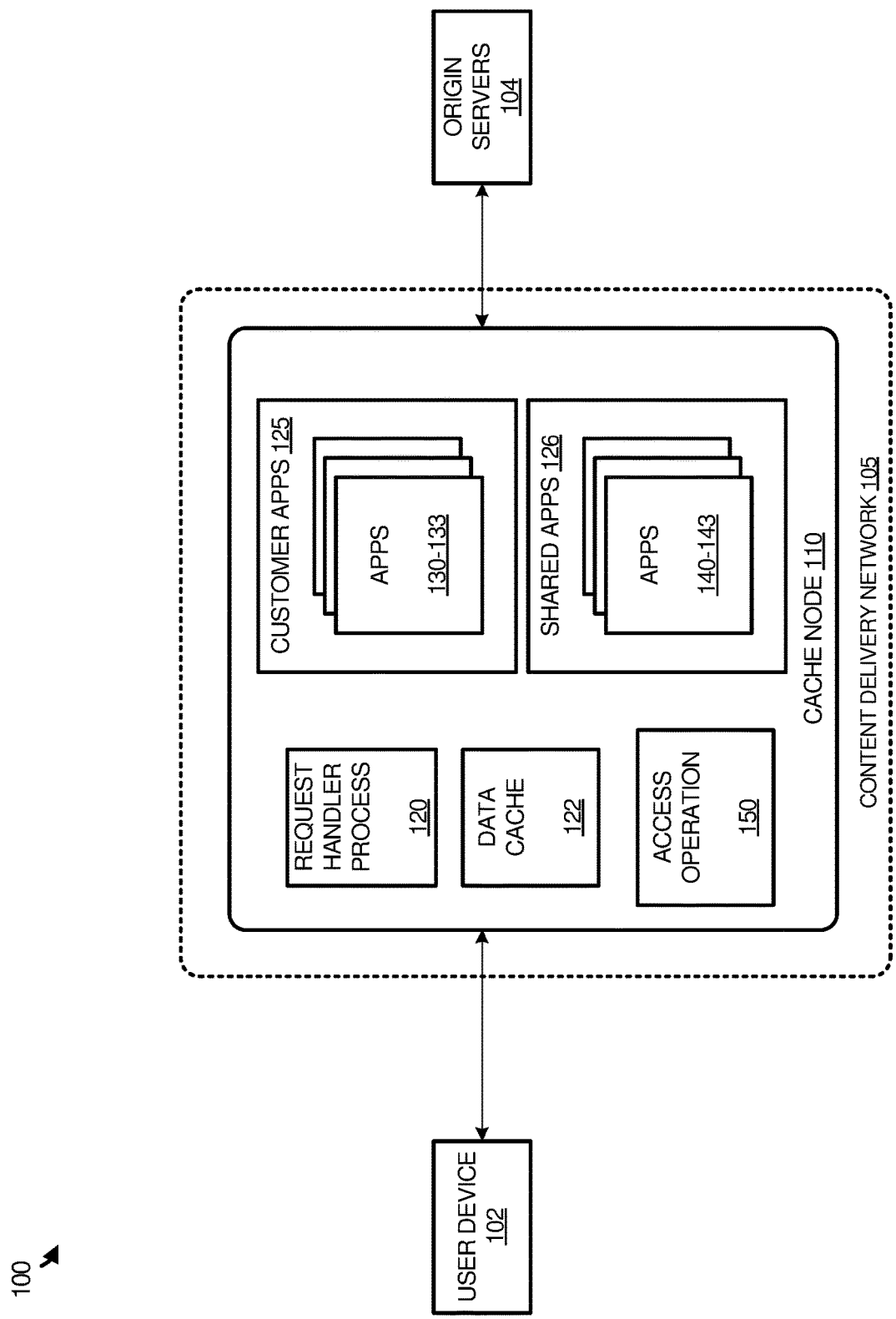
FIG. 1 illustrates a communication system for implementing shared applications at the edge of a content delivery network according to an implementation.

Technology is disclosed herein for isolating applications at the edge. In a highly simplified example, a content delivery network serves as an intermediary between end users and customer origins. A typical server or cache node in a content delivery network receives requests for content from end-user applications and web browsers. A layer of software on the server that is managed by the network operator serves the content to the end-user from its cache or retrieves the content from a customer origin if the content is not in the cache or is stale. This layer of software may comprise a Varnish Configuration Language (VCL) service, an Apache Traffic Server service, or some other Hypertext Transfer Protocol (HTTP) acceleration service.

In addition to being processed by the network operator's software, the request may also be passed to application code that is managed by the customer. The customer application code may perform any of a variety of functions with respect to the request or the content such as resizing an image, translating application programming interface (API) requests, or breaking down a single request into multiple requests.

In some examples, for a request to be safely processed by a given customer application in isolation from other requests and other applications, an isolation runtime environment is provided. The isolation runtime environment selects an isolation resource from a reserved set of isolation resources to support the request and establishes a context that can be used for the request. (The isolation resources may be referred to as virtual machines or virtual nodes in some scenarios.) The context includes, for example, an address pointer or range of addresses that correspond to the isolation resource allocated for use by the customer application's native code. The isolation runtime then calls that native code and passes the context to it. The native code begins to execute and in so doing, may attempt to access a memory location that has yet to receive a copy of the required data. This causes a fault, which the isolation runtime handles by copying data from an artifact associated with the application to the memory location. The native code is then able to resume executing and, for example, read and process the data that is now stored at the memory location. Once the execution of the native code is completed, the isolation runtime process may return control of the process to the layer of software managed by the network operator.

In some implementations, in deploying the application to the cache nodes, a customer may write the application in a first programming language (C, C++, Rust, and the like). Once written, the application be compiled into an assembly code and then native code for execution on edge systems, such as cache nodes. The compiler enforces the isolation runtime parameters (memory requirements, variable requirements, execution constraints, and the like) when compiling the program and produces an artifact for the application. The artifact includes the native code to execute the application and further includes metadata, wherein the metadata may comprise global variables used by the application, configuration requirements of the application, execution constraints of the application, and the like. The artifact may then be deployed to and loaded in the various isolation runtime environments in the cache nodes distributed across a content delivery network.

Here, in providing the various applications at the edge cache nodes of the content delivery network, applications may be executable by multiple customers of the content delivery network. These applications may be used to identify advertisements for end users requesting content, generate security parameters associated with a request from an end user, identify attributes associated with a requesting user, optimizing imaging data or videos to be supplied to a requesting user, or some other operation. To initiate the shared applications, an HTTP acceleration service or another application may generate a request for the application. In response to the request, the cache node may determine whether the request is permitted based on the customer associated with the request. In some examples, the cache node may maintain at least one data structure to determine that defines which customers (websites, news providers, social networks, and the like) are provided access to each of the shared applications. If a customer is permitted access to an application, the cache node may allocate an isolation resource to support the request and initiate execution of the corresponding application. In contrast, if the application is not permitted, the request may be blocked. Additionally, the cache node may generate a log entry, terminate the request to the cache node, generate a notification for an administrator, or provide some other action in association with the request.

FIG. 1 illustrates a communication system 100 for implementing shared applications at the edge of a content delivery network according to an implementation. Communication system 100 includes user device 102, content delivery network 105, and origin servers 105. Content delivery network 105 may include a plurality of cache nodes, an example of which is represented as cache node 110. Cache node 110 further includes request handler process 120, data cache 122, access operation 150, customer applications 125 with applications 130-333, and shared applications 126 with applications 140-143.

In operation, content delivery network 105 deploys cache nodes, such as cache node 110, to cache and provide content to requesting users over the internet. In particular, when a request is generated from a user device over the internet, a domain name service may direct the request to cache node in content delivery network 105. As a result, rather than each request from an end user device being directed to an origin server in origin servers 104, cache nodes in the content delivery network may cache content from the origin servers and supply the content to the requesting end user device.

In the present implementation, when a request is generated from user device 102, the request is directed to cache node 110. When a request is received, the request may be processed using request handler process 120, wherein request handler process 120 may comprise a VCL service, an Apache Traffic Server service, or some other HTTP acceleration service. Request handler process 120 may determine how the requests are handled and how responses are given to content requests. In some implementations, a request handler process may be organized into subroutines that execute at different times, and often include if-then statements that are used to implement administrator defined rules for the various content requests. Here, request handler process 120 may identify that the content request from user device 102 corresponds to an application in customer applications 125 or shared applications 126, where customer applications 125 may each be unique to a customer of content delivery network 105 and where shared applications 126 may be shared between multiple customers of content delivery network 105. The applications may be used to identify advertisements for end users requesting content, generate security parameters associated with a request from an end user, identify attributes associated with a requesting user, optimize imaging data or videos to be supplied to a requesting user, or some other operation. The applications may be used to obtain data from origin servers 104, identify relevant data in data cache 122, modify data in data cache 122, or provide some other operation with respect to the content request.

In some examples, each of the applications may be capable of operating as an isolation instance when invoked from a content request by a user device. To implement an isolation instance, each application may comprise an artifact that includes native code to implement the application and further includes metadata that is representative of variables, a fault data structure, configuration information, or some other similar information related to the application. When an application instance is required, a memory space may be selected to isolate the execution instance of the application. Once selected, the code may be executed and use the memory space that was allocated to the instance of the application. In some examples, a runtime process may monitor for faults in the execution of the runtime code and respond to the faults using the metadata that is stored as part of the artifact. Although these are one example of providing an isolation resource, it should be understood that a cache node may employ virtual machines or containers to support an application request.

Figure 2:
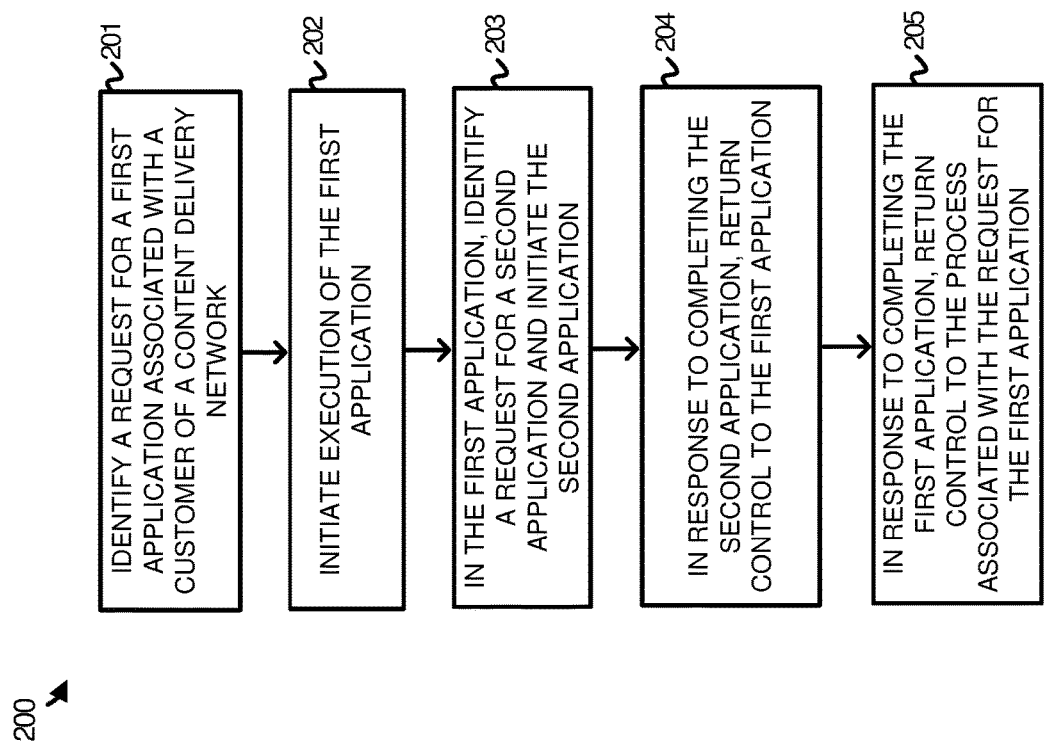
FIG. 2 illustrates an operation of a cache server to provide shared applications to customers according to an implementation.

FIG. 2 illustrates an operation 200 of a node server to provide shared applications to customers according to an implementation. The processes of operation 200 are referenced parenthetically in the paragraphs that follow with reference to systems and elements of communication system 100 of FIG. 1. Operation 200 provides an example of initiating a shared application from within another application, however, a shared application may be requested from a request handler process in some examples.

As depicted, a cache node implements operation 200 to identify (201) a request for a first application associated with a customer of the content delivery network. For example, user device 102 may generate a content request that is received by cache node 110, wherein the content request may correspond to a video service provider that caches content using content delivery network 110. In response to receiving the request, cache node 110 may initiate request handler process 120 to determine how to handle the content request. In at least one example, the content request from user device 102 may require the initiation of an application, wherein the application may provide various operations with respect to the content request. These operations may include optimizing images or video, identifying relevant advertisements for an end user, or providing some other operation with respect to the content request. The operations may be used to add, modify, or identify relevant content for data cache 122, or may be used to identify relevant attributes associated with a content request.

Once the request for the application is identified, operation 200 may initiate (202) execution of the first application, wherein the first application may be associated with a particular customer of the content delivery network. In some implementations, when an application is requested, cache node 110 may consult with one or more data structures to determine whether the customer is associated with the requested application. Once determined, the application may be initiated to support the request. In some implementations, the application may comprise a container or a virtual machine. In other implementations, the application may execute as an isolation instance, which is allocated its own memory space. In particular, an application may include executable code and metadata. When a request is identified to initiate the application, the request may be allocated memory and the code may execute according to constraints defined in the metadata as further described in FIGS. 5-7.

Once the first application is initiated, the first application may identify (203) a request for a second application and initiate execution of the second application, wherein the second application may comprise an application shared by a plurality of customers in the content delivery network. In some implementations, when the second application is invoked by the first application, the cache node may be required to determine whether the customer associated with the first application has permissions to access the second application. For example, to support a content request from user device 102, request handler process 120 may initiate application 130. During the execution of application 130, an application request may be generated that corresponds to application 140 in shared applications 126. When a shared application is requested, cache node 110 may consult access operation 150, which may comprise one or more data structures, to determine whether the second application is available to the customer associated with the request. If access operation 150 indicates that the application is available to the customer, then the application may be initiated as an isolation resource as described herein.

In some examples, in determining the permissions associated with each of the customers, customers may select or subscribe to different applications. These applications may be generated by the customer, by other customers, by third party developers, by the provider of content delivery network 105, or by some other entity. Once an application is generated, a controller or management system in the content delivery network may distribute the application to one or more cache nodes in the content delivery network. In some examples, the applications may be deployed to every cache node, however, it should be understood that the applications may be deployed to a subset of the cache nodes. This subset may be selected based on geographical location, the types of content cached by the cache nodes, or some other criteria.

After initiating the second application, cache node 110 may wait until the completion of the second application. In response to completing the second application, operation 200 may return (204) control to the first application. Additionally, in response to completing the first application, operation 200 may return (205) control to the process or operation associated with the request for the first application. In some examples, when each of the applications is completed, information may be provided to the requesting operation (HTTP acceleration service or other application). The information may indicate whether the application was successful, memory locations for any stored data in data cache 122, any information identified for the corresponding user, or some other information related to the operations of the application. As a result, the requesting operation for the application may use data derived from the executed application to provide the requested content to user device 102.

Figure 3:
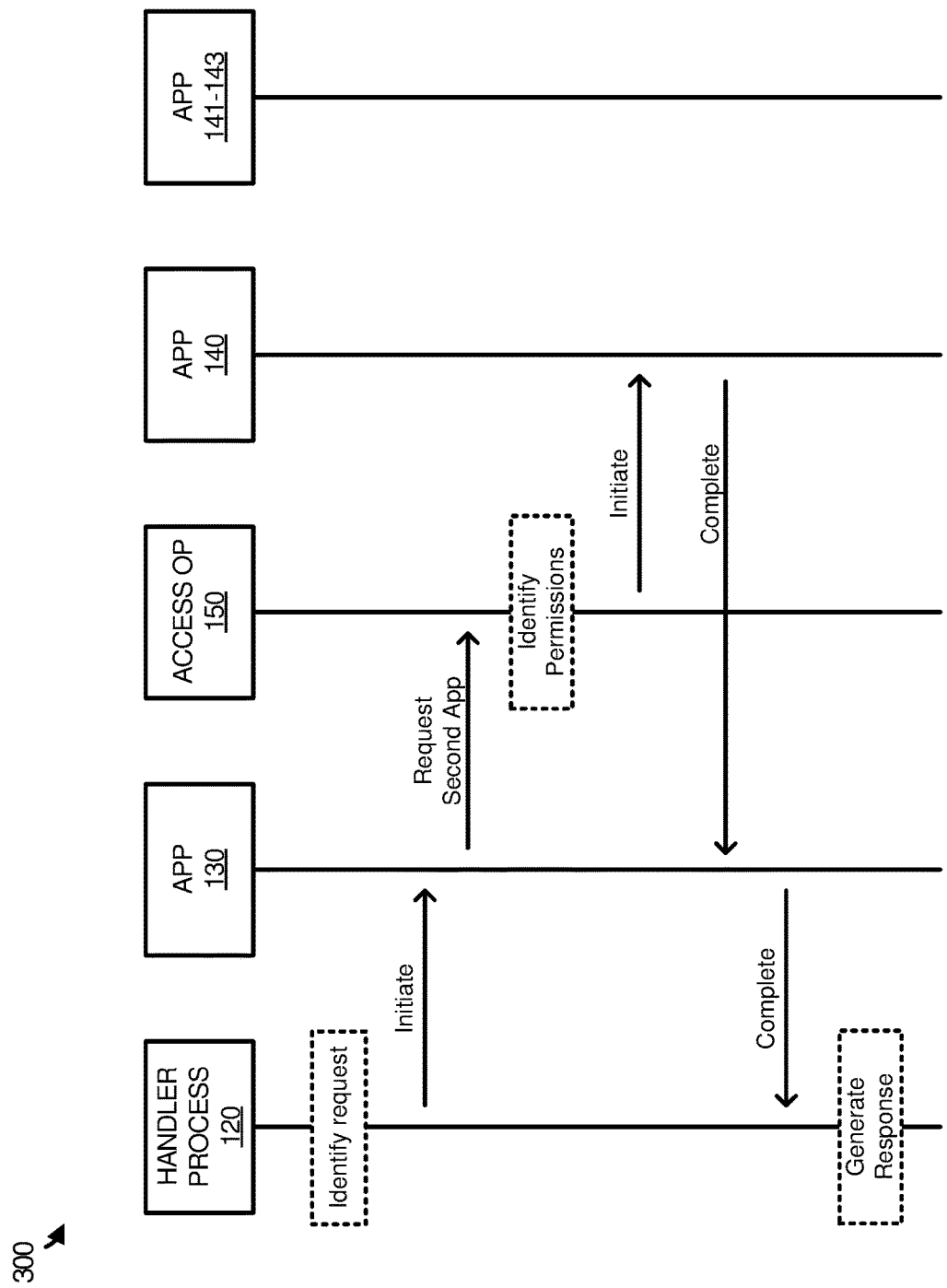
FIG. 3 illustrates a timing diagram to initiate applications at an edge cache node according to an implementation.

FIG. 3 illustrates a timing diagram 300 to initiate applications at an edge cache node according to an implementation. Timing diagram 300 includes handler process 120, application 130, access operation 150, application 140, and applications 141-143.

As depicted, request handler process 120 may identify a request for application 130, wherein application 130 may be associated with a customer of the content delivery network. In some implementations, a request for an application may appear in a format associated with the HTTP accelerator service, such as in the form of a command from an if-then statement. When the request is identified, request handler process 120 may initiate application 130, wherein application 130 may be initiated as an isolation instance in some examples. In at least one implementation, each of the applications that are provided to the cache node may include executable code and metadata that is representative of variables, a fault data structure, configuration information, or some other similar information related to the application. When an instance of an application is required, a runtime operation or process may be called, wherein the runtime process may allocate a memory space to the isolation instance and initiate the execution of the application code. During the execution of the application code, a runtime process may monitor for faults in the execution of the runtime code and respond to the faults using the metadata. These responses may include identifying errors, moving data into the memory locations, or providing some other action in association with the execution of the application. Advantageously, memory space may only be used by the applications as it is required, limiting the quantity of writes to memory to provide the functions of the application. Further description regarding the execution of an isolated instance of an application is provided with respect to FIGS. 5-7.

After initiating application 130 as an isolated instance, application 130 may include a request to initiate a second application. In some examples, the cache node may identify the request and forward the request to access operation 150, wherein access operation 150 may be used to identify permissions associated with the customer associated with the content request. In some implementations, access operation 150 may maintain one or more data structures that can associated content delivery network customers with available applications. Customers may be associated with applications based on a subscription to the applications, based on a payment tier to the content delivery network, or based on some other factor. As an example, a shared application between customers may be used to identify relevant advertisement images to be provided as part of a content request. The customer may be identified based on a domain name associated with the request, a token associated with a request, or based on some other attributes indicated in the request and identifiable by the cache node.

Here, in response to the request for the second application, the cache node determines that the customer is able to access application 140 (the second application) and initiates the second application. In some examples, the second application may execute as an isolation instance using similar isolation techniques to those described with respect to application 130. Once initiated, application 140 may execute to completion and a notification may be provided to application 130 indicating the completion of the application. Additionally, after completing application 130, a completion notification may be provided to request handler process 120. Based on operations from application 130 and application 140, handler process 120 may provide content to a requesting user device.

In some implementations, applications 130 and 140 may return information back to the corresponding requesting process. This information may indicate whether the application was successful in providing a desired task, storage locations or addresses for content, or some other information. As an example, application 130 may be responsible for identifying an image (content) cached in a data cache, such as data cache 122 of FIG. 1. Once the image is identified, application 130 may invoke application 140 to optimize the image to respond to the request. After optimizing the image, application 140 may indicate a cache storage address associated with the image, may indicate a success of the operation, or may provide some other indication to application 130. Application 130 may then return a notification to request handler process 120 indicating a storage location associated with the image of interest.

Although demonstrated as requesting a shared application from another application, it should be understood that request handler process 120 may generate the request for the shared application. For example, an HTTP acceleration service may initiate a request for application 142 in shared applications 126. In response to the request, access operation 150 may determine whether the customer is capable of accessing the requested application and may execute the application when the customer is permitted to execute the application.

In some implementations, in addition to, or in place of, permitting applications based on the customer associated with the content provided, access operation 150 may use an end user identifier to determine whether or not an edge application should be provided to the end user. For example, a customer may allocate different tiers or qualities of service to each of the customers, wherein a first tier may permit content to be obtained from the edge, while another tier may require content to be obtained from an origin server. In another example, a first tier of customers may be identified that can provide increased security (e.g., encryption) using an application local to a cache server, while a second tier of customers may not be provided with access to the same application. When a request is received, cache node 110 may identify a request for an application. In response to the request, cache node 110 may identify a customer associated with the request and an end user associated with the request, wherein the user may be identified via a source IP address, a token, or some other information about the source of the request. Once the customer and user are identified, cache node 110 may determine whether the application is available to the customer and user and initiate an isolation instance if the application is available. If the application is not available, then request handler process 120 or another application may perform one or more other actions to respond to the request. These operations may include providing an error to the requesting user device, identifying other content for the request, or providing some other operation.

FIG. 4 illustrates a data structure 400 to manage application permissions on a cache node according to an implementation. Data structure 400 is representative of a data structure that may be implemented by a cache node to determine applications available to content requests. Data structure 400 includes application identifier (ID) column 410 with applications 411-413 and customer columns 420-423 with customers 430-436.

In operation, applications are distributed in a content delivery network that permit customers to provide various content functions at the edge of the delivery network. The operations may include image optimization, advertisement management, security, or some other operation. As the applications are provided to the cache nodes, each of the applications may be associated with one or more customers that are permitted to access the application. In particular, when a request is identified for the application, the cache node may consult with data structure 400 to determine whether the customer is associated with a particular application or has the application available to the customer. The customer may be identified using the domain associated with the customer, using tokens or cookies associated with the content, or identified in some other manner.

As an example, an application may be used to provide video optimization for end user devices based on the type of device requesting the content. When a request is received, the cache node may identify a request for the application and determine whether the customer can execute the application. If permitted, then the cache node may execute the application using an isolation node or instance to support the request. Thus, if a request were generated by customer 430 for application 411, the cache node may execute the application, while a request by customer 435, the cache node may prevent the execution of the application, generate a log file indicating the improper request, generate a notification for an administrator, or provide some other functionality, including combinations thereof.

In some examples, in addition to or in place of providing permissions to the various customers, the cache node may further monitor or track the quantity that each of the applications is used by a customer. This information may be used to provide feedback to a developer of the application, to bill the customer using the application, to provide usage statistics to the content delivery network, or to provide some other functionality. In some implementations, the cache node may generate log entries that can be reported back to a management system for the content delivery network. From the log entries, the management system may be used to bill the customers using the various applications, generate a usage statistic model for one or more of the applications, or provide some other feedback regarding the usage of the applications at one or more of the cache nodes in the content delivery network.

Although demonstrated in the example of FIG. 4 as providing permissions based on the customer associated with the request (e.g., website, news provider, etc.), it should be understood that at least a portion of the permissions may be determined based on the requesting user. In some examples, the permissions may be based on the IP address associated with the user, a token provided by the user, or some other credential or identifier associated with the user. The identifier may be used to provide different qualities of service to the various end users, wherein a request from a first end user may execute a first application that identifies first advertisements, while a second end user may execute a second application (or no application) to provide advertisements in response to a content request. This is just one example of different operations that could be provided in response to a user request, however, any number of other operations may be provided by a cache node.

Figure 5:
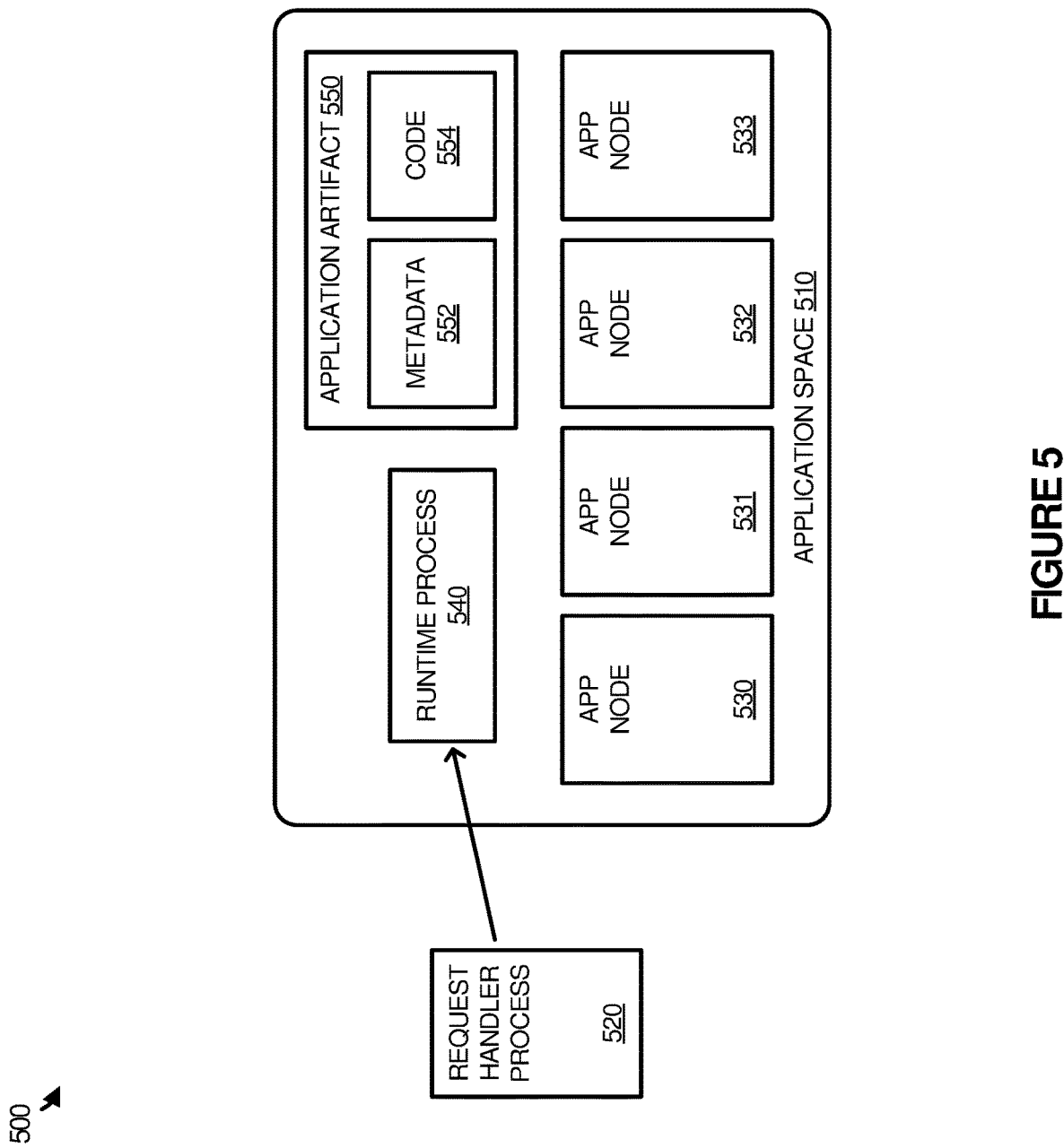
FIG. 5 illustrates a computing environment cache of initiating applications in a content delivery network according to an implementation.

FIG. 5 illustrates a computing environment 500 with a cache node capable of initiating applications in a content delivery network according to an implementation. Computing environment 500 includes request handler process 520 and application space 510, which may be implemented in one or more cache nodes or other edge computing systems. Application space 510 is representative of elements that provide sandboxed execution instances for an application. Application space 510 includes runtime process 540, application artifact 550 with metadata 552 and code 554, and application nodes 530-533. Application nodes 530-533 are representative of isolation resources that can provide sandboxed or isolated platforms for each iteration of an application.

As described herein, content providers or customers of a content delivery network may desire to implement one or more applications at cache nodes or other edge devices, such that content may be processed closer to a requesting user. In handling a request from an end user device, a request handler process 520, which may comprise a VCL operation, an Apache Traffic Server operation, or some other HTTP acceleration service, may determine how the requests are handled and how responses are given to content requests. In some implementations, a request handler process may be organized into subroutines that execute at different times, and often include a plurality of if-then statements that are used to implement administrator defined rules for the various content requests. In some implementations, request handler process 520 may include operations that are used to trigger an application that can provide image processing, video processing, or some other operation. For example, an application deployed at a cache node may provide image optimization for a requesting device and browser.

Here, when an application is identified by request handler process 520, request handler process 520 may communicate with a runtime process 540 associated with the application. Runtime process 540 is used to initiate the execution of the application using code 554, allocate the required resources for the application in one of applications nodes 530-533 including metadata 552, and manage faults identified during the execution of the code. In at least one example, runtime process 540 may identify or select an application node from application nodes 530-533. Once selected, runtime process 540 may initiate execution of code 554, wherein code 554 is passed context that comprises at least addressing information or a pointer to the application node for the execution instance of the application. In some implementations, application nodes 530-533 are representative of memory spaces that can be used to isolate a first execution instance from one or more other execution instances of the same application. After initiating execution of code 554 and providing access to the application node allocated to the request, code 554 may generate requests to obtain data from memory locations of the allocated application node. For example, if an execution instance were allocated application node 530, code 554 may initiate a request to read data from a memory location in application node 530. In response to the request, a fault may occur as data has not yet been written to the memory location in the application node. To provide the required data, runtime process 540 may monitor for when the faults occur and determine how to respond to the faults. Thus, if code 554 requested a variable that had not yet been copied into the memory space for application node 530, runtime process 540 may identify the variable within metadata 552 and copy the variable into the corresponding location of application node 530. Once copied, code 554 may access the required data for future operations. Advantageously, data may be copied into each of the application nodes as the data is required, limiting the amount of resources that are required for each isolated execution of the application.

Figure 6:
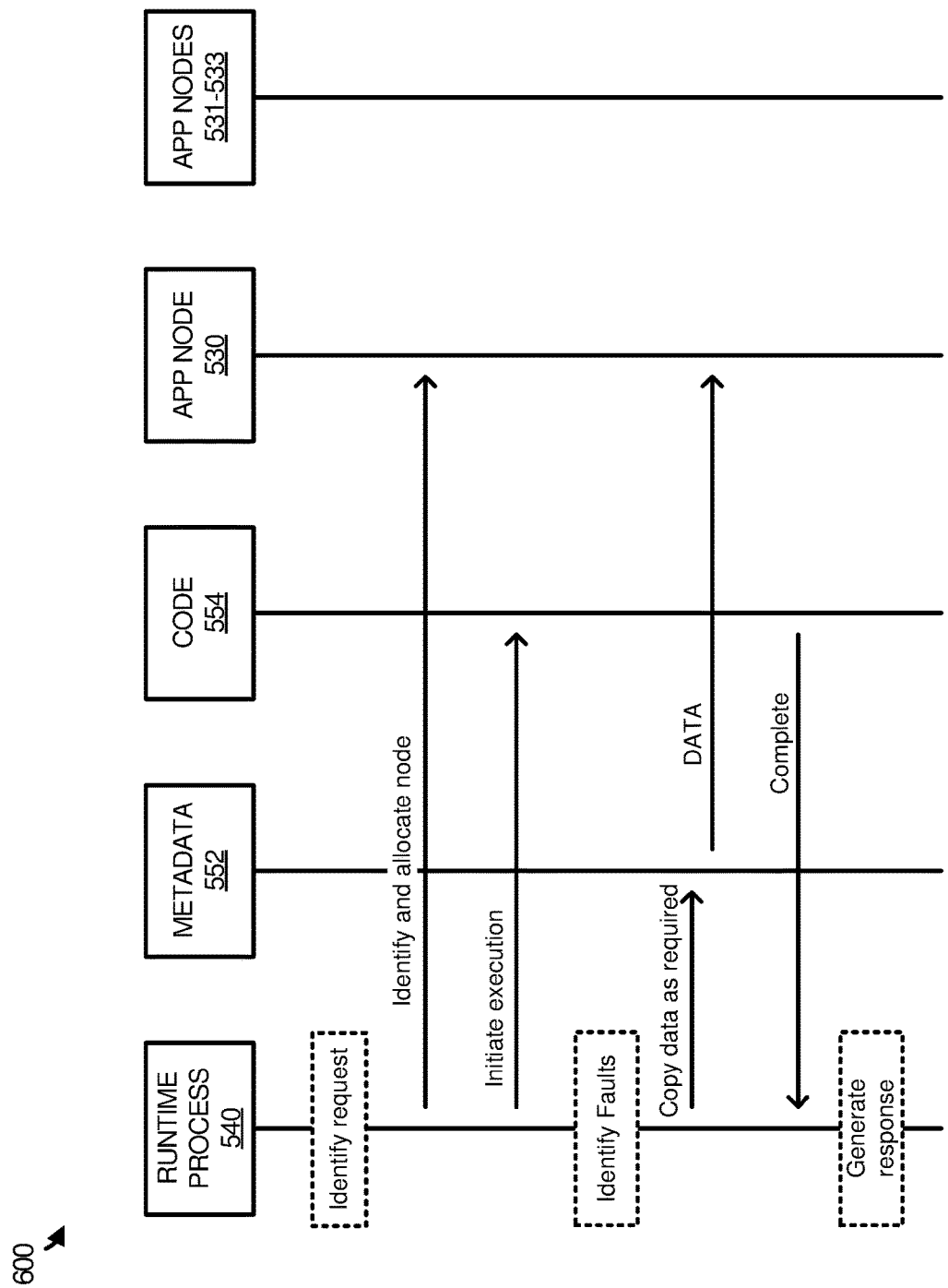
FIG. 6 illustrates a timing diagram of an isolation instance according to an implementation.

Although demonstrated in the example of FIG. 5 with a single application, it should be understood that any number of applications may be deployed in the edge systems to provide various operations. In deploying the applications, each of the applications may be distributed as an application artifact with metadata and native code specific to the application. Additionally, each of the applications may implement their own or share a runtime process to provide the allocation and configuration operations in response to requests. The runtime process or processes may use the same application nodes or different application nodes. Further, each of the application FIG. 6 illustrates a timing diagram 600 to execute an application in an edge computing system according to an implementation. Timing diagram 600 includes systems and elements from computing environment 500 of FIG. 5. Although demonstrated as allocating the memory space associated with application node 530 to support a request, it should be understood that any available node (e.g., node that is not allocated to another application execution instance) may be allocated to support the request for the application.

As depicted, runtime process 540 identifies a request to initiate an application associated with application space 510. To support the execution of the application in an edge computing system, an application artifact 550 is generated that includes the native code 554 for execution on the computing system and metadata 552 that is used to support the execution. The metadata may include information about global variables used in the execution of the application, a fault data structure to be used when faults occur in the execution of the native code, resource allocation requirements, or some other similar information to support the execution of the native code.

In some implementations, to generate the application artifact, a management system, such as a management system, may compile an application that is written in a first language to a second language (WebAssembly). Once compiled, the management system may determine whether the application in the second language complies with constraints for the edge deployment computing systems, such as cache nodes. These constraints may comprise memory usage, security, loops, race conditions, or some other similar constraints. In some implementations, if the application fails to meet the constraints, the application may be prevented from deployment to the edge computing systems, however, in other implementations, a trap data structure may be generated that associates possible issues of the application identified from the constraints with error codes or fault handling operations. These operations may include generating a notification for a user associated with the creation of the application, stopping the execution of the application, or providing some other fault response. The fault operations may be defined by the developer of the application, may be defined by the management system based on the type of threat, or may be defined in any other manner. In some examples, the WebAssembly code may be compared to information in one or more data structures to determine when the WebAssembly code qualifies for one or more constraints. Once the constraints are identified from the WebAssembly code, application artifact 550 may be generated with metadata 552 and code 554, wherein code 554 corresponds to native code that is executable by the edge service.

In response to identifying the request to execute the application, runtime process 540 may identify and allocate an application node 530 that is available to support the request. This application node may comprise a memory space available to store at least a portion of metadata 552 associated with the application. Once an application node is allocated to support the request, runtime process 540 may initiate execution of code 554 and pass code 554 metadata to code 554, wherein the metadata may be used to at least access the memory space associated with application node 530 (e.g., a memory pointer to application node 530).

After code 554 is initiated, code 554 may require access to application node 530 to obtain variables and other data associated with the application. However, a fault may occur if the data is not yet stored in application node 554. As a result, runtime process 540 may monitor for the faults to occur and may determine how to respond to the faults. Using the data access request example, runtime process 540 may determine that a variable is required by code 554 to provide the operation and may copy the variable (such as a global variable) into the required memory location in application node 530. Once copied, code 554 may access the data from the memory space associated with application node 530.

After the execution of the code, runtime process 540 may provide a result to the request handler process indicating that the required operation was completed. For example, if code 554 performed image optimization for a request, code 554 with runtime process 540 may generate or identify the required optimized image and generate a notification that could be provided to the request handler process. Once the notification is provided to the request handler process, the request handler process may be used to respond to the request by providing the associated optimized image.

In some implementations, the metadata may comprise variables that are unique to the execution instance of the application. In particular, when application node 530 is identified to support the request, runtime process 540 may initiate an operation that writes one or more variables from metadata into application node 530 as the variables are required by code 554. In this manner, the variables may not interfere with the operations of one or more other application instances that are executing on the computing system. Rather, when a variable is required by code 554, code 554 may use an addressing pointer provided by runtime process 540 that corresponds to application node 530 and obtain the required variable from application node 530. Thus, the variables for each instance of the application may be separated into addressing spaces defined by application nodes 530-533. The size and formatting of each of the application nodes memory spaces may also be defined by the metadata, wherein the metadata may identify an initial size requirement of the memory space, a maximum memory size for the application (e.g. as new variables are added during execution), or some other information related to the configuration requirements of the application.

In some implementations, metadata 552 may include a trap data structure that indicates constraints of the application during execution. These constraints may include faults that can be encountered during the execution of the application memory usage, security, loops, race conditions, or some other similar constraint. In at least one example, when a fault is identified, which can be determined by monitoring the Linux operation "userfaultfd," the trap data structure may define how to respond to fault. The response may be determined by the management system when the application artifact is created, may be determined by a user for one or more of the constraints, or may be determined in any other manner. The response may include writing data to the memory space for the application node, such as the case when a request for a variable is identified that is stored as part of the metadata, may include returning error information to the user that generated the content request, stopping or restarting the execution of the application, providing error information to the content provider that generated the application, or providing some other operation. For example, code 554 may encounter an operation that performs an improper mathematical operation (e.g., divide by zero). Rather than causing the computing system to crash, runtime process 540 may monitor for the fault and determine how to respond to the fault using the metadata 552.

In some examples, the application on the cache node may be unique to a particular customer or content provider. In other examples, the application may be shared by multiple customers and the cache node may manage the access permissions of the customers to the application.

Figure 7:
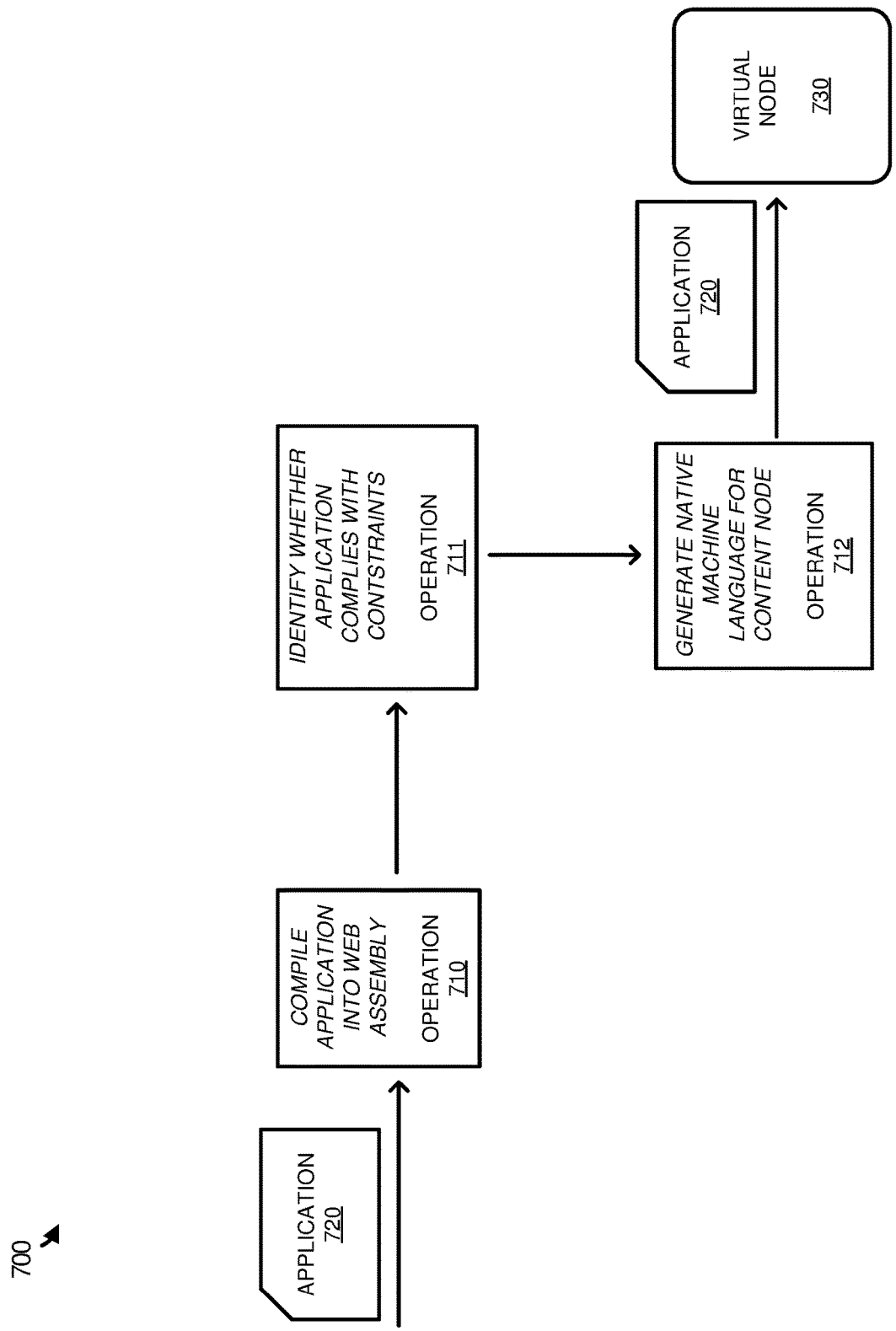
FIG. 7 illustrates an operational scenario of generating an application to be deployed in a content delivery network according to an implementation.

FIG. 7 illustrates an operational scenario 700 of generating an application to be deployed in a content delivery network according to an implementation. Operational scenario 700 includes operations 710-712, application 720, and virtual node 730.

In operation, a content provider (e.g. a website provider) generates application 720 using a first programming language. Once generated and identified by a management system for the content delivery network, the management system compiles the application into WebAssembly code at operation 710. Once compiled or translated into the WebAssembly code, operation 711 is performed by the management system to identify whether the application complies with constraints for cache nodes of the content delivery network. In some implementations, in determining whether the application complies with the constraints, the application may operate in a simulated environment to determine whether the application complies with defined constraints for the cache nodes of the network. These may include processing constraints, memory constraints, loops and race conditions, or some other similar constraints. In many implementations, the constraints may be defined by an administrator of the content delivery network, however, it should be understood that the constraints may be determined based on resources available in the cache nodes, or some other similar method of identifying constraints of the physical cache nodes in the content delivery network. If an application does not meet the constraints, then a notification may be provided to the administrator associated with the application indicating that the application in its current state cannot be deployed. In contrast, if the application does meet the constraints, the application may move to operation 712.

In particular, when the application meets the constraints, operation 712 will generate native machine language (such as x86 code) for the cache nodes of the content delivery network and deploy application 720 as at least one virtual node within the content delivery network. This virtual node may comprise a container or may comprise a virtual machine.

In some implementations, once the application is deployed in a cache node, the application may work with one or more other virtual nodes that also execute in the cache node for the service provider. As an example, a content service provider may deploy its own configuration of HTTP acceleration as a virtual node that provides specific operations for the content requests associated with the service provider. To assist the operations of the HTTP acceleration virtual node, the HTTP acceleration virtual node may generate function calls to initiate and implement the application node. For example, when a content request comprises a video request for a video that is not currently cached in the cache node, the HTTP acceleration service may generate a call to the application to optimize the video obtained from the origin server before providing the content to the end user. In this manner, applications that are deployed for a service provider may work in conjunction with the acceleration service to provide desired operations on the content that is provided to the end user.

In some implementations, in interacting with the application on the server, the application may use an API to communicate outside of the virtual nodes. These API commands may include commands such as PUT (PRINT), GET_REQUEST, SEND_RESPONSE, and other similar commands to provide the desired operation. By providing the API with a limited number of functions, the communications of each of the applications may be limited. Accordingly, when content is to be processed by the application, the application may use a first command to obtain the data (from the local cache or the origin), process the data in accordance with the application, and provide the processed content to the desired location.

In some examples, when the application is deployed, the application may be deployed as a container or virtual machine image that can be initiated on various cache nodes of the content delivery network. Accordingly, once an application is determined to comply with the constraints of the network, and the native machine language is generated for the application, the application may be deployed as virtual node image across a plurality of cache nodes in the content delivery network.

In some implementations, the applications may be distributed in a content delivery network to cache nodes based on the requirements of the application. The applications may be distributed based on hardware requirements of the application, data cached at the cache nodes, geographic location of the cache nodes, or based on some other factor. For example, an application developer may generate an application to be used for advertisements in a particular country. When the application is distributed in the content delivery network, the management service may identify cache nodes within the network that correspond to the country of interest and provide the application to the corresponding cache nodes. Once distributed, customers and/or users may be allocated permissions that permit content requests to access the particular application. This may include initiating the application from an HTTP accelerations service or another application on the cache node.

Figure 8:
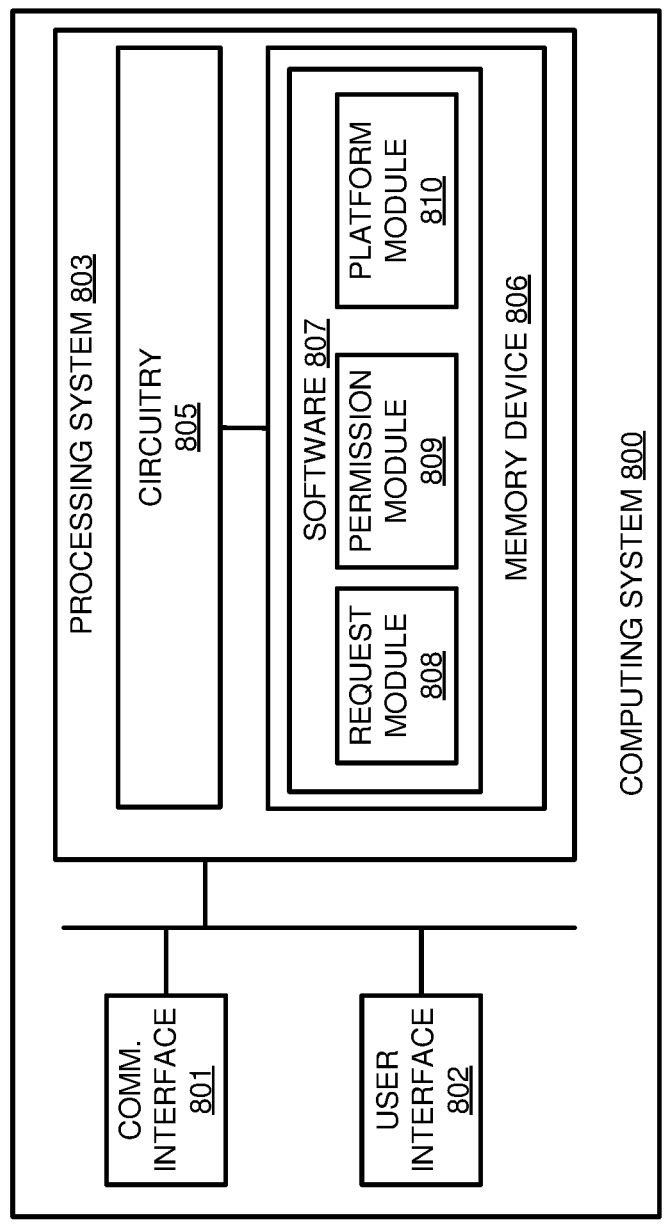
FIG. 8 illustrates a cache node computing system according to an implementation.

FIG. 8 illustrates a cache node computing system 800 according to an implementation. Computing system 800 is representative of any computing system or systems with which the various operational architectures, processes, scenarios, and sequences disclosed herein for a management system may be implemented. Computing system 800 is an example of cache node 110 of FIG. 1, although other examples may exist. Computing system 800 comprises communication interface 801, user interface 802, and processing system 803. Processing system 803 is linked to communication interface 801 and user interface 802. Processing system 803 includes processing circuitry 805 and memory device 806 that stores operating software 807. Computing system 800 may include other well-known components such as a battery and enclosure that are not shown for clarity. Computing system 800 may comprise one or more server computing systems, desktop computing systems, laptop computing systems, or any other computing system, including combinations thereof.

Communication interface 801 comprises components that communicate over communication links, such as network cards, ports, radio frequency (RF), processing circuitry and software, or some other communication devices. Communication interface 801 may be configured to communicate over metallic, wireless, or optical links. Communication interface 801 may be configured to use Time Division Multiplex (TDM), Internet Protocol (IP), Ethernet, optical networking, wireless protocols, communication signaling, or some other communication format—including combinations thereof. In particular, communication interface 801 is configured to communicate with cache nodes of the content delivery network to configure the cache nodes with HTTP acceleration services and applications.

User interface 802 comprises components that interact with a user to receive user inputs and to present media and/or information. User interface 802 may include a speaker, microphone, buttons, lights, display screen, touch screen, touch pad, scroll wheel, communication port, or some other user input/output apparatus—including combinations thereof. User interface 802 may be omitted in some examples.

Processing circuitry 805 comprises microprocessor and other circuitry that retrieves and executes operating software 807 from memory device 806. Memory device 806 comprises a non-transitory storage medium, such as a disk drive, flash drive, data storage circuitry, or some other memory apparatus. Processing circuitry 805 is typically mounted on a circuit board that may also hold memory device 806 and portions of communication interface 801 and user interface 802. Operating software 807 comprises computer programs, firmware, or some other form of machine-readable processing instructions. Operating software 807 includes request module 808, permission module 809, and platform module 810, although any number of software modules may provide the same operation. Operating software 807 may further include an operating system, utilities, drivers, network interfaces, applications, or some other type of software. When executed by processing circuitry 805, operating software 807 directs processing system 803 to operate computing system 800 as described herein.

In at least one implementation, request module 808 directs processing system 803 to identify a request for an application on the cache node, wherein the application may be shared by multiple customers of the content delivery network. In response to the request, permission module 809 may direct processing system 803 to determine whether the customer associated with the request is permitted to access the application. In some examples, computing system 800 may maintain one or more data structures that indicate applications available to the various customers of the content delivery network. When a request is identified for an application, either from an HTTP acceleration service or another application, permission module 809 may determine whether the customer is permitted to execute the application using the one or more data structures.

Once the request is permitted for the application, platform module 810 may initiate an isolation instance to support the application. In some examples, the isolation instance may comprise a virtual machine or container. In other examples, the isolation instance may comprise a memory space that can be used to store data for the application instance. In particular, the application may comprise the executable code and metadata for the application. When the application is executed, the combination of the executable code and the metadata may be used to determine how data is stored for the application instance in the content cache or in the memory space allocated to the application.

In some examples, the applications may be generated by the customers of the content delivery network, the content delivery network itself, third party application developers, or some other application developer. When developed, the content delivery network may determine whether the application meets any constraints or rules associated with the content delivery network and may distribute the application to the cache nodes of the network. The applications may be distributed based on the customers associated with the application, based on geographical constraints, based on processing resource constraints, or based on some other factor. In some examples, the application may be distributed from Returning to the elements of FIG. 1, cache node 110 and origin servers 104 can each include communication interfaces, network interfaces, processing systems, computer systems, microprocessors, storage systems, storage media, or some other processing devices or software systems, and can be distributed among multiple devices. Examples of cache node 110 and origin servers 104 can include software such as an operating system, logs, databases, utilities, drivers, caching software, networking software, and other software stored on a computer-readable medium. Cache node 110 and origin servers 104 may each comprise, in some examples, one or more server computing systems, desktop computing systems, laptop computing systems, or any other computing system, including combinations thereof.

User device 102 can be a user device, subscriber equipment, customer equipment, access terminal, smartphone, personal digital assistant (PDA), computer, tablet computing device, e-book, Internet appliance, media player, game console, or some other user communication apparatus, including combinations thereof. User device 102 can include communication interfaces, network interfaces, processing systems, computer systems, microprocessors, storage systems, storage media, or some other processing devices or software systems.

Communication links between the elements of communication system 100 can use metal, glass, optical, air, space, or some other material as the transport media. The communication links can each use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. The communication links can each be a direct link or can include intermediate networks, systems, or devices, and can include a logical network link transported over multiple physical links. Although one main link is illustrated between user device 102 and cache node 110 and between cache node 110 and origin servers 104, it should be understood that the links are merely illustrative to show communication modes or access pathways. In other examples, further links can be shown, with portions of the further links shared and used for different communication sessions or different content types, among other configurations. The communication links can each include many different signals sharing the same associated link, as represented by the associated lines in FIG. 1, comprising resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:
    identifying a request for an application on a cache node of a content delivery network, wherein the application is shared amongst a plurality of customers;
    determining that a customer associated with the request is permitted to execute the application;
    in response to determining that the customer is permitted to execute the application, initiating the application as an isolation instance, comprising:
        identifying an isolation resource from a plurality of isolation resources reserved in advance of the request;
        identifying an artifact associated with the application, wherein the artifact comprises code and metadata; and
        initiating execution of the code for the application and passing context to the code; and
    in response to completing the application, returning control to a source operation associated with the request.

2. The method of claim 1, wherein identifying the request for the application comprises identifying the request for the application from a Hypertext Transfer Protocol (HTTP) acceleration service.

3. The method of claim 1, wherein identifying the request for the application comprises identifying the request for the application from a second application associated with the customer.

4. The method of claim 3 further comprising:
    identifying a second request for the second application; and
    in response to completing the second application, returning control to a Hypertext Transfer Protocol (HTTP) acceleration service.

5. The method of claim 4, wherein identifying the second request for the second application comprises identifying the second request in the HTTP acceleration service.

6. The method of claim 1, wherein the application comprises an image optimization application, advertisement application, or security application.

7. The method of claim 1, wherein the isolation resource comprises a memory space, wherein the context comprises an addressing pointer to a memory location in the memory space.

8. A computing apparatus comprising:
    a storage system;
    a processing system operatively coupled to the storage system; and program instructions stored on the storage system that, when executed by the processing system, direct the processing system to:
- identify a request for an application on a cache node of a content delivery network, wherein the application is shared amongst a plurality of customers;
- determine that a customer associated with the request is permitted to execute the application;
- in response to determine that the customer is permitted to execute the application, initiating the application as an isolation instance, comprising:
  - identifying an isolation resource from a plurality of isolation resources reserved in advance of the request;
  - identifying an artifact associated with the application; and
  - initiating execution of code for the application and passing context to the code; and
- in response to completing the application, return control to a source operation associated with the request.

9. The computing apparatus of claim 8, wherein identifying the request for the application comprises identifying the request for the application from a Hypertext Transfer Protocol (HTTP) acceleration service.

10. The computing apparatus of claim 8, wherein identifying the request for the application comprises identifying the request for the application from a second application associated with the customer.

11. The computing apparatus of claim 10, wherein the program instructions further direct the processing system to:
- identify a second request for the second application; and
- in response to completing the second application, returning control to a Hypertext Transfer Protocol (HTTP) acceleration service.

12. The computing apparatus of claim 11, wherein identifying the second request for the second application comprises identifying the second request in the HTTP acceleration service.

13. The computing apparatus of claim 8, wherein the application comprises an image optimization application, advertisement application, or security application.

14. The computing apparatus of claim 8, wherein the isolation resource comprises a memory space, wherein the context comprises an addressing pointer to a memory location in the memory space.

15. The computing apparatus of claim 8, wherein the program instructions further direct the processing system to, after initiating execution of the code, copy data from the artifact to the isolation resource using the context.

16. The computing apparatus of claim 8, wherein the program instructions further direct the processing system to maintain a record indicative of usage of the application by the customer.

17. A method comprising:
- maintaining an application repository on a cache node of a content delivery network, wherein each application in the application repository is available to one or more customers of the content delivery network;
- identifying a request for an application in the application repository, wherein the application is available to two or more customers;
- determining that a customer associated with the request is permitted to execute the application;
- identifying an isolation resource from a plurality of isolation resources reserved in advance of the request;
- identifying an artifact associated with the application, wherein the artifact comprises code and metadata;
- initiating execution of the code for the application and passing context to the code;
and
- in response to completing the application, returning control to a source operation associated with the request.

18. The method of 17 further comprising, after initiating execution of the code, copy data from the artifact to the isolation resource using the context.

* * * * *